(12) United States Patent
Komatsu et al.

(10) Patent No.: US 10,850,376 B2
(45) Date of Patent: Dec. 1, 2020

(54) TENSIONING DEVICE

(71) Applicant: TOHNICHI MFG. CO., LTD., Tokyo (JP)

(72) Inventors: Kyoichi Komatsu, Tokyo (JP); Hiroshi Tsuji, Tokyo (JP); Osamu Tsuji, Tokyo (JP); Seiji Ito, Tokyo (JP)

(73) Assignee: TOHNICHI MFG. CO., LTD., Tokyo (JP)

( * ) Notice: Subject to any disclaimer, the term of this patent is extended or adjusted under 35 U.S.C. 154(b) by 6 days.

(21) Appl. No.: 16/480,888

(22) PCT Filed: Oct. 10, 2018

(86) PCT No.: PCT/JP2018/037744
§ 371 (c)(1),
(2) Date: Jul. 25, 2019

(87) PCT Pub. No.: WO2019/167328
PCT Pub. Date: Sep. 6, 2019

(65) Prior Publication Data
US 2020/0171637 A1 Jun. 4, 2020

(30) Foreign Application Priority Data
Feb. 28, 2018 (JP) .................. 2018-035404

(51) Int. Cl.
*B25B 29/02* (2006.01)
(52) U.S. Cl.
CPC .................. *B25B 29/02* (2013.01)
(58) Field of Classification Search
CPC ......... B25B 29/02; G01L 5/24; G01L 5/0033; F16B 35/06
See application file for complete search history.

(56) References Cited

U.S. PATENT DOCUMENTS 6,421,902 B1 7/2002 Loeffler
6,494,426 B1 12/2002 Wilks
(Continued)

FOREIGN PATENT DOCUMENTS

CN   101226088 A   7/2008
CN   201386726 Y   1/2010
(Continued)

OTHER PUBLICATIONS

PCT/ISA/210, "International Search Report for International Application No. PCT/JP2018/037744," dated Jan. 8, 2019.
(Continued)

*Primary Examiner* — David B. Thomas
(74) *Attorney, Agent, or Firm* — Manabu Kanesaka

(57) ABSTRACT

A tensioning device is configured to apply upward tension to a bolt-nut fastener including a bolt fitted with a fastened member H, and a nut to be fastened to a shaft of the bolt, which protrudes from the fastened member. A first male thread portion is formed on an outer circumferential surface of the nut. The tensioning device includes a connection member having a first female thread portion to be engaged with the first male thread portion, a tensioning mechanism for tensioning the nut via the connection member in a state where the first male thread portion is engaged with the first female thread portion, and a tension bearer which is disposed around an outer circumference of the connection member, and bears a reaction force applied from the fastened member H in tensioning performed by the tensioning mechanism.

12 Claims, 13 Drawing Sheets

(56) References Cited

U.S. PATENT DOCUMENTS

| | | | |
|---|---|---|---|
| 9,188,146 B1* | 11/2015 | Trautman | B25B 29/02 |
| 9,248,532 B2* | 2/2016 | Wagner | B25B 29/02 |
| 9,289,888 B2* | 3/2016 | Kastner | B23P 19/067 |
| 9,381,632 B2* | 7/2016 | Hohmann | B25B 23/0064 |
| 9,506,492 B2* | 11/2016 | Trautman | B25B 29/02 |
| 9,744,656 B2* | 8/2017 | Hohmann | B25B 29/02 |
| 9,878,430 B2* | 1/2018 | Hohmann | B25B 29/02 |
| 9,981,369 B2* | 5/2018 | Hohmann | B23P 19/067 |
| 10,173,309 B2* | 1/2019 | Jaeger | B25B 29/02 |
| 10,239,194 B2* | 3/2019 | Hohmann | B25B 29/02 |
| 10,252,405 B2* | 4/2019 | Bartels | B25B 29/02 |
| 10,322,478 B2* | 6/2019 | Hohmann | B23P 19/067 |
| 10,364,835 B2* | 7/2019 | Trautman | B25B 29/02 |
| 10,569,401 B2* | 2/2020 | Ribault | B23P 19/067 |
| 2009/0084197 A1 | 4/2009 | Lohr | |
| 2016/0297057 A1* | 10/2016 | Ribault | B25B 29/02 |
| 2017/0175793 A1 | 6/2017 | Leathlean | |
| 2018/0215022 A1* | 8/2018 | Guisasola | B25B 29/02 |
| 2019/0061075 A1* | 2/2019 | Hohmann | B25B 23/1456 |

FOREIGN PATENT DOCUMENTS

| | | |
|---|---|---|
| CN | 103245452 A | 8/2013 |
| CN | 203259287 U | 10/2013 |
| CN | 203670410 U | 6/2014 |
| JP | H01-026013 A | 1/1989 |
| JP | H08-166299 A | 6/1996 |
| JP | H10-170362 A | 6/1998 |
| JP | 2006-337058 A | 12/2006 |
| JP | 4028254 B2 | 12/2007 |
| JP | 2011-021989 A | 2/2011 |
| JP | 2014-149043 A | 8/2014 |
| TW | M255785 U | 1/2005 |

OTHER PUBLICATIONS

Japan Patent Office, "Office Action for Japanese Patent Application No. 2018-035404," dated Apr. 24, 2018.

China Patent Office, "Office Action for Chinese Patent Application No. 201880009251.2," dated Mar. 26, 2020.

* cited by examiner

TENSIONING DEVICE

RELATED APPLICATIONS

The present application is National Phase of International Application No. PCT/JP2018/037744 filed Oct. 10, 2018, and claims priority from Japanese Application No. 2018-035404, filed Feb. 28, 2018, the disclosure of which is hereby incorporated by reference herein in its entirety.

TECHNICAL FIELD

The present invention relates to a tensioning device which applies tension upwardly to a bolt fastened to a fastened member.

BACKGROUND ART

Machines such as automobiles, and structures such as bridges are assembled through fastening with screws. The strength of the screw as the fastener largely relies on the tightening force. Meanwhile, monitoring of the fastening force applied to the bolt fasteners is performed by measuring the torque and the rotation only during tightening of them. After the tightening, there are seldom chances of controlling the tightening force. However, there may cause the bolt to be loosened owing to unexpected external force in operation of the machine to lower the tightening force. This may considerably increase the risk of fatigue fracture. It is therefore necessary to pay attention to detection of the tightening force applied to the fastened bolt in order to prevent the rupture accident of the bolt, and improve reliability of the screw fastener.

Patent Literature 1 discloses the method of detecting tightening force of a bolt-nut fastener, the bolt-nut fastener being configured so that the bolt is inserted into an insertion hole of a fastened member and the nut is thready engaged with the male thread portion of the bolt inserted into the insertion hole for fastening the fastened member to be clamped therebetween, wherein the male thread portion of the bolt protruding from the upper surface is subjected to tension to detect the transition point of the spring constant of the bolt, and the tension force at the transition point is determined as the tightening force.

CITATION LIST

Patent Literature

Patent Literature 1: Japanese Patent No. 4028254

SUMMARY OF INVENTION

Technical Problem

The method of detecting the tightening force as disclosed in Patent Literature 1 requires the female thread portion of the tensioning member to be thready engaged with the male thread portion of the bolt protruding from the upper surface of the nut. Because of a small shaft diameter of the bolt, and a short extension length of the bolt shaft protruding from the upper surface of the nut, the circumferential length of the thread portion to be thready engaged may be insufficient. The insufficient circumferential length of the thread portion to be thready engaged may plastically deform the thread ridge during tensioning to the bolt via the tensioning member, causing the increase of the axial force detection error.

It is an object of the present invention to improve engagement between a tensioning device and a bolt-nut fastener. This ensures to suppress deterioration in accuracy of detection such as axial force detection owing to insufficient circumferential length of the thread to be thready engaged.

Solution to Problem

The tensioning device according to the present invention as described below may solve the above-described problem.

(1) The tensioning device applies upward tension to a bolt-nut fastener including a bolt insertedly fitted with a fastened member, and a nut to be fastened to a shaft of the bolt, which protrudes from the fastened member. The nut has a first male thread portion formed on an outer circumferential surface. The tensioning device includes a connection member having a first female thread portion to be thready engaged with the first male thread portion, a tensioning mechanism which tensions the nut via the connection member while having the first male thread portion thready engaged with the first female thread portion, and a tension bearer which is disposed around an outer circumference of the connection member, and bears a reaction force applied from the fastened member in tensioning performed by the tensioning mechanism.

(2) In the tensioning device according to the above-described (1), the tensioning mechanism includes a tension rod, a bearing which rotatably supports the tension rod around a vertically extending shaft portion, and a rotation mechanism serving to rotate the tension rod around the shaft portion. A convex portion having a second male thread portion formed on an outer circumferential surface is disposed on an upper end of the contact member. A hollow portion having a second female thread portion to be thready engaged with the second male thread portion on an inner circumferential surface is formed in a lower end of the tension rod.

(3) In the tensioning device according to the above-described (2), the tension bearer is vertically interposed between the bearing and the fastened member.

(4) In the tensioning device according to the above-described (2) or (3), the convex portion has an axial diameter which is substantially the same as that of the bolt, and a friction torque reducing agent for reducing a friction torque is applied to the second male thread portion and the second female thread portion.

(5) In the tensioning device according to any one of the above-described (1) to (4), a tensile strength of the connection member is higher than that of the bolt.

(6) In the tensioning device according to any one of the above-described (1) to (5), the nut is a hexagonal nut, having the first male thread portion formed on a bending shape portion of the outer circumferential surface of the nut.

(7) In the tensioning device according to the above-described (6), the following relational expressions (1) and/or (2) are satisfied:

$$D1 > S \times 1.03 \quad (1)$$

$$D2 < S \times 1.10 \quad (2)$$

where S denotes a width across flat of the nut, D1 denotes an outer diameter of a male thread of the first male thread portion, and D2 denotes a bottom diameter of a male thread of the first male thread portion.

(8) In the tensioning device according to any one of the above-described (1) to (5), the nut is a dodecagonal nut, having the first male thread portion formed on a bending shape portion on an outer circumferential surface of the nut.

(9) In the tensioning device according to the above-described (8), the following relational expressions (3) and/or (4) are satisfied:

$$D1 > S \times 1.04 \tag{3}$$

$$D2 < S \times 1.13 \tag{4}$$

where S denotes a width across flat of the nut, D1 denotes an outer diameter of a male thread of the first male thread portion, and D2 denotes a bottom diameter of a male thread of the first male thread portion.

(10) In the tensioning device according to any one of the above-described (1) to (5), the nut is a square nut, having the first male thread portion formed on a bending shape portion on an outer circumferential surface of the nut.

(11) In the tensioning device according to the above-described (10), the following relational expressions (5) and/or (6) are satisfied:

$$D1 > S \times 1.03 \tag{5}$$

$$D2 < S \times 1.32 \tag{6}$$

where S denotes a width across flat of the nut, D1 denotes an outer diameter of a male thread of the first male thread portion, and D2 denotes a bottom diameter of a male thread of the first male thread portion.

(12) In the tensioning device according to any one of the above-described (1) to (5), the nut is a flange nut having a nut main body and a flange, and the first male thread portion is formed on at least one of the nut main body and the flange.

(13) In the tensioning device according to any one of the above-described (1) to (12), the connection member includes a concave portion which prevents a contact with the shaft protruding from the nut.

(14) In the tensioning device according to the above-described (1) or (2), in tensioning performed by the tensioning mechanism, a protection plate intervenes between the tension bearer and the fastened member.

(15) In the tensioning device according to the above-described (14), a contact area of the protection plate with the fastened member is adjusted so that a deformation amount S1 of the fastened member just below the nut before starting tensioning by the tensioning mechanism is substantially equalized to a deformation amount S2 of the fastened member just below the protection plate after starting tensioning by the tensioning mechanism.

(16) In the tensioning device according to the above-described (1) or (2), a contact area of the tension bearer with the fastened member is adjusted so that a deformation amount S1 of the fastened member just below the nut before starting tensioning by the tensioning mechanism is substantially equalized to a deformation amount S2 of the fastened member just below the tension bearer after starting tensioning by the tensioning mechanism.

Advantageous Effects of Invention

According to the present invention, the female thread portion of the tensioning device is threadly engaged with the male thread portion formed on an outer circumferential surface of the nut so that the bolt-nut fastener is tensioned. This makes it possible to improve engagement between the tensioning device and the bolt-nut fastener.

DESCRIPTION OF EMBODIMENTS

Figure 1:
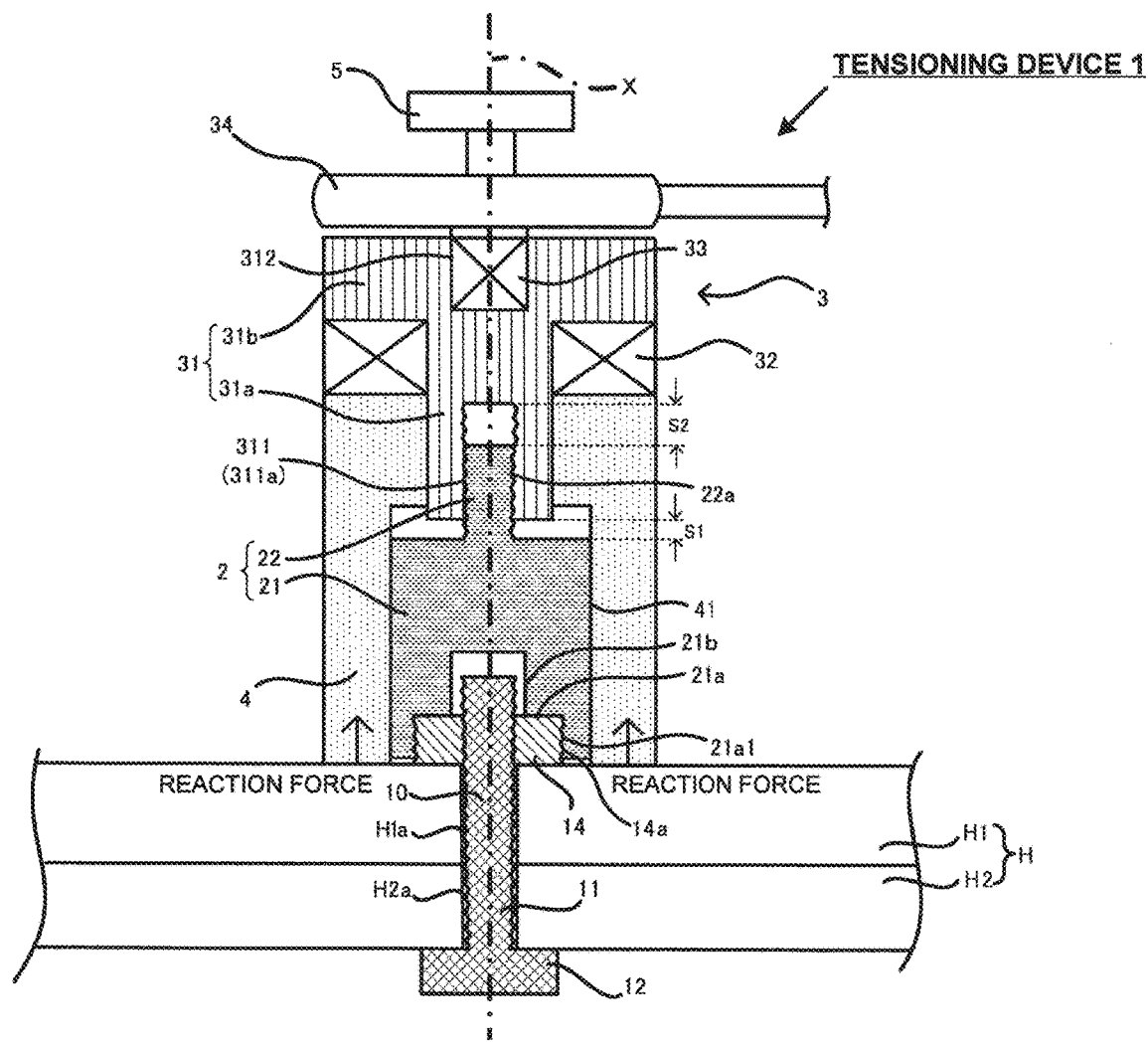
FIG. 1 is a schematic view of a tensioning device (first embodiment).

Embodiments of the present invention will be described referring to the drawings.

First Embodiment

The tensioning device of this embodiment is a device for tensioning the bolt-nut fastener which clamps a fastened member by inserting a bolt into an insertion hole of the fastened member, and threadly engaging a nut with a male thread portion of the bolt which has been inserted into the insertion hole. The tension device is used for detection of axial force of the bolt (in other words, tightening force of the bolt), and detection of spring constant of the fastened member to which the bolt-nut fastener is fastened. The basic concept of the axial force detection is similar to the one disclosed in Japanese Patent No. 4028254. In the following embodiments, structures and operations of the tensioning devices will be described by taking the axial force detection as an example.

Figure 2A:
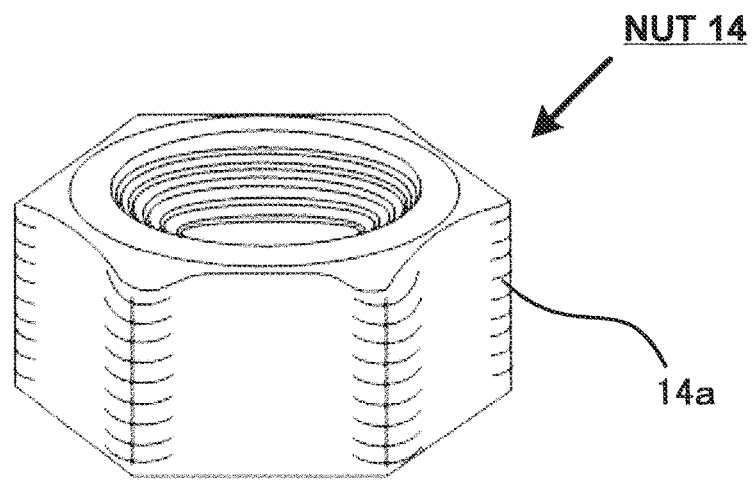
FIG. 2(a) is a perspective view of a nut (first embodiment).

FIG. 1 is a schematic view of a tensioning device of the embodiment in the state just after starting tensioning the bolt-nut fastener. A plurality of members constituting the tensioning device are marked with mutually different hatchings so as to clarify each boundary among those members. FIG. 2(a) is a perspective view of the nut. A tensioning device 1 includes a connection member 2, a tensioning mechanism 3, a tension bearer 4, and a handle 5. A vertically extending rotation axis X of the tensioning device 1 is indicated by an alternate long and short dashed line.

The connection member 2 includes a column portion 21 and a convex portion 22 formed on the upper surface of the column portion 21. A first hollow portion 21a of connection member and a second hollow portion 21b of connection member (corresponding to a concave portion) connected to the upper end of the first hollow portion 21a of connection member are formed in a lower end of the column portion 21. The second hollow portion 21b of connection member has its diameter set to be larger than that of the first hollow portion 21a of connection member.

A first female thread portion 21a1 extending around the rotation axis X is formed on a circumferential surface of the first hollow portion 21a of connection member. The convex portion 22 is formed to have a column shape with a diameter smaller than that of the column portion 21. A second male thread portion 22a extending around the rotation axis X is formed on the outer circumferential surface of the convex portion. The connection member 2 may be made of a material with higher tensile strength than the bolt 10. This makes it possible to prevent plastic deformation of the connection member 2 in the axial force detection.

The tensioning mechanism 3 includes a tension rod 31, a bearing 32, an angle drive 33 (corresponding to a rotation mechanism), and a wrench 34 (corresponding to a rotation mechanism). The tension rod 31 includes a columnar small-diameter rod portion 31a and a columnar large-diameter rod portion 31b. An upper end portion of the small-diameter rod portion 31a and a lower end portion of the large-diameter rod portion 31b are connected to each other. The small-diameter rod portion 31a and the large-diameter rod portion 31b are integrally formed.

A tension rod hollow portion 311 is formed in a lower end of the small-diameter rod portion 31a. A second female thread portion 311a extending around the rotation axis X is formed on an inner circumferential surface of the tension rod hollow portion 311. A mount opening 312 is formed in an upper end of the large-diameter rod portion 31b.

The bearing 32 is formed as a thrust bearing for rotatably supporting the small-diameter rod portion 31a of the tension rod 31. An upper end surface of the bearing 32 comes in contact with the large-diameter rod portion 31b of the tension rod 31. A lower end surface of the bearing 32 comes in contact with an upper end surface of the tension bearer 4. That is, the bearing 32 is vertically interposed between the large-diameter rod portion 31b and the tension bearer 4.

The angle drive 33 is detachably fitted with the mount opening 312 of the large-diameter rod portion 31b. Rotating the angle drive 33 allows the tension rod 31 to rotate around the rotation axis X. The angle drive 33 may be rotated using the handle 5 and the wrench 34. The embodiment is structured so that the connection member 2 moves up by the amount corresponding to the thread pitch of the second female thread portion 311a of the tension rod 31 upon a single round rotation of the tension rod 31 around the rotation axis X using the wrench 34. In the embodiment, the tension rod 31 is rotated using the angle drive 33, the handle 5, and the wrench 34. The present invention is not limited to the above-described example. It is possible to use any other drive means capable of generating power for rotating the tension rod 31.

The wrench 34 is a horizontally long shaped so as to generate the torque larger than the one generated by the handle 5 in rotation with the same force. The wrench 34 includes a not shown angle sensor (gyro sensor, for example). The angle sensor allows measurement of the rotation amount of the tension rod 31. It is possible to attach the angle sensor directly to the tension rod 31 instead of the wrench 34.

The tension bearer 4 includes a not shown axial force detection unit for detecting the axial force. For example, a strain gauge may be used as the axial force detection unit. The strain gauge is deformed by the force applied thereto, and outputs an electrical signal in accordance with the amount of deformation. A vertically extending tension hollow portion 41 is formed in a lower end of the tension bearer 4. The connection member 2 is stored in the tension hollow portion 41. The column portion 21 of the connection member 2 is disposed along the inner circumferential surface of the tension hollow portion 41. In other words, the tension bearer 4 is disposed to surround the connection member 2.

The structure of the tensioning mechanism 3 is not limited to the above-described example. Any other structure is available so long as the connection member 2 and the bolt-nut fastener can be moved up without being rotated. For example, a concave portion with the female thread on its inner circumferential surface is formed in the upper surface of the column portion 21, and a convex portion with the male thread on its outer circumferential surface is formed on the lower end of the tension rod 31 (that is, the lower end of the small-diameter rod portion 31a). The convex portion is then threadly engaged with the female thread so as to apply tension to the connection member 2 and the bolt-nut fastener. It is possible to detect the axial force by hydraulically measuring the tension force and the vertical displacement instead of the rotating operation performed by the tension rod 31.

A detailed explanation will be made with respect to the bolt-nut fastener and the fastened member. The bolt 10 as a hexagon head bolt includes a bolt shaft 11 and a bolt head 12. The bolt 10 may be a dodecagon head bolt, and a square head bolt, for example (this applies to other embodiments and modified examples). The bolt shaft 11 has a male thread formed thereon. The fastened member H includes the fastened body H1 and a fastened body H2, which are vertically stacked. The fastened bodies H1 and H2 have bolt holes H1a and H2a, respectively. Both of the bolt holes H1a and H2a have no thread ridges.

The bolt shaft 11 protrudes from the upper surface of the fastened member H. A nut 14 is fastened to the protruding shaft. That is, the fastened member H is clamped between the bolt head 12 and the nut 14. In this embodiment, a hexagon head bolt is used as the bolt 10. The present invention is applicable to other types of bolt to be used with the nut, for example, a hexagon socket bolt, a square head bolt, a flange bolt and the like.

As FIG. 2(a) shows, first male thread portions 14a are formed on a side surface of the nut 14 in a circumferential direction at intervals. That is, each of the first male thread portions 14a is formed into a bending shape portion on the side surface of the nut 14. Preferably, the first male thread portions 14a having each length substantially equalized are formed on all the bending shape portions. For example, in the case of a part of the bending shape portion on which the first male thread portion 14a is not formed, the load is exerted in the direction different from the tensioning direction (that is, vertical direction). This may cause the risk of deteriorating accuracy of the axial force detection.

Assuming that a width across flat of the nut 14 is defined as S, an "outer diameter of a male thread" of the first male thread portion 14a is defined as D1, and a "bottom diameter of a male thread" of the first male thread portion 14a is defined as D2, it is preferable to satisfy the following relational expressions (1) and/or (2). The width across flat denotes the inter-axial distance between two opposite sides of the nut 14 (this applies to other embodiments and modified examples).

$$D1 > S \times 1.03 \quad (1)$$

$$D2 < S \times 1.10 \quad (2)$$

By satisfying the relational expression (1), engagement of the fastening tool with the nut 14 may be improved when fastening the bolt-nut fastener to the fastened member H. By satisfying the relational expression (2), engagement of the first male thread portion 14a with the first female thread portion 21a1 of the connection member 2 may be improved when tensioning the nut 14 with the connection member 2.

The friction torque of the nut 14 exerted to the bolt 10 is set to be larger than that of the connection member 2 exerted to the tension rod 31. That is, the friction torque between the nut 14 and the bolt 10 which are in the fastened state is larger than the friction torque between the second male thread portion 22a of the convex portion 22 and the second female thread portion 311a of the tension rod 31, which are in the threadly engaged state. This makes it possible to prevent rotation of the nut 14 in the axial force detection.

In the embodiment, in order to establish the above-described correlation between two different friction torques, each diameter dimension of the bolt shaft 11 and the convex portion 22 is set to be substantially equalized, and the friction torque of the convex portion 22 to the second female thread portion 311a of the tension rod 31 is reduced by applying the lubricant (corresponding to the friction torque reducing agent). There may be another method of reducing the friction torque in which the diameter of the convex portion 22 is set to be smaller than that of the bolt shaft 11. However, if the diameter of the convex portion 22 becomes smaller, the stress resultant from tensioning is increased to cause the risk of damage to the convex portion 22. In this embodiment, the correlation between the different friction torques may be established by substantially equalizing the diameter dimensions of the bolt shaft 11 and the convex portion 22, and reducing the friction torque between the convex portion 22 and the tension rod 31 using the lubricant.

Operations of the tensioning device 1 in the axial force detection will be described on the assumption that the bolt-nut fastener is fastened to the fastened member H in the initial state. It is also assumed that the tensioning mechanism 3, the tension bearer 4, and the handle 5 are preliminarily assembled to be unitized.

The first male thread portion 14a of the nut 14 is threadly engaged with the first female thread portion 21a1 of the connection member 2 so that the connection member 2 and the nut 14 are connected. Predetermined tensioning start conditions have to be satisfied for starting tensioning by threadly engaging the first male thread portion 14a and the first female thread portion 21a1. Followings are the predetermined tensioning start conditions (1) and (2).

(Condition 1): The first female thread portion 21a1 is threadly engaged with the first male thread portion 14a with its length equal to or longer than the single-round of the outer circumferential surface of the nut 14.

(Condition 2): A clearance is formed between the lower end of the connection member 2 and the fastened body H1.

Failing to satisfy the condition 1 causes the nut 14 to have the region where no tensile force is applied in the circumferential direction (in other words, the region which does not abut on the first female thread portion 21a1). As a result, the load is exerted in the direction different from the tensioning direction (that is, vertical direction), resulting in the risk of deteriorating accuracy of the axial force detection. Failing to satisfy the condition 1 also causes plastic deformation of the thread ridge in tensioning, resulting in the risk of deteriorating accuracy of detection such as the axial force detection.

Failing to satisfy the condition 2 may increase the detection error because the axial force is detected in the pressure contact state between the lower end of the connection member 2 and the fastened body H1.

When the connection member 2 is rotated around the rotation axis X so as to threadly engage the first male thread portion 14a and the first female thread portion 21a1 for connection between the connection member 2 and the nut 14, the connection member 2 will threadly advance downwardly. Further rotation of the connection member 2 around the rotation axis X brings the upper surface of the nut 14 into abutment on the ceiling surface of the first hollow portion 21a of connection member. As a result, the connection member 2 is no longer rotatable. The upper surface of the nut 14 may include the concave or the convex portion formed thereon. That is, it may be configured to make the connection member 2 unrotatable in abutment on the concave or the convex portion.

The embodiment is configured to satisfy conditions 1 and 2 when the upper surface of the nut 14 abuts on the ceiling surface of the first hollow portion 21a of connection member (when the connection member becomes no longer threadly advanceable). As the clearance formed between the lower end of the connection member 2 and the fastened body H1 does not have to be visually confirmed for every axial force detection, the accurate axial force detection may be performed through the simplified method.

Then a top end of the convex portion 22 of the connection member 2 is aligned with the lower end of the tension rod hollow portion 311. At this time, the tension bearer 4 is positioned above the fastened body H1 (in other words, the tension bearer 4 and the fastened body H1 are not in contact with each other). The handle 5 is then manually rotated around the rotation axis X to threadly engage the second female thread portion 311a and the second male thread portion 22a. Further rotation of the handle 5 allows the tension rod 31 to threadly advance downwardly together with the bearing 32 and the tension bearer 4. The tension bearer 4 is then seated on the fastened body H1.

FIG. 1 shows the state just after abutment of the tension bearer 4 on the fastened body H1. In this state, a clearance S1 is formed between the lower end of the tension rod 31 and the upper end of the column portion 21. A clearance S2 larger than the clearance S1 is formed between the top end of the convex portion 22 and the upper end of the tension rod hollow portion 311.

When the tension bearer 4 is seated on the fastened body H1, the tension rod 31 cannot be rotated any further because of small torque generated by the manually operated handle 5. The manually operated wrench 34 allows further rotation of the tension rod 31. This allows the connection member 2 to move up while being kept unrotatable.

As the connection member 2 moves up, downward pressing force is applied to the tension bearer 4 from the large-diameter rod portion 31b via the bearing 32. Since the tension bearer 4 seated on the fastened body H1 cannot move down, it is clamped between the bearing 32 and the fastened body H1 which, in turn, applies reaction force to the tension bearer 4. At this time, the strain gauge outputs the electrical signal (voltage, for example), based on which the axial force may be calculated. The calculated axial force may be displayed on a not shown display unit formed on the outer circumferential surface of the wrench 34 or the tension bearer 4, for example. The clearance S2 larger than the clearance S1 is capable of preventing abutment of the convex portion 22 on the upper end of the tension rod hollow portion 311 before abutment of the column portion 21 on the small-diameter rod portion 31a. As the operation length sufficient to apply tension to the bolt 10 may be secured, the problem of incapability of axial force detection may be avoided.

In the embodiment, the first male thread portions 14a are formed on the outer circumferential surface of the nut 14 having the diameter dimension larger than that of the bolt shaft 11. It is possible to enlarge the area where the first male thread portion 14a is threadly engaged with the first female thread portion 21a1.

First Modified Example of First Embodiment

Figure 2B:
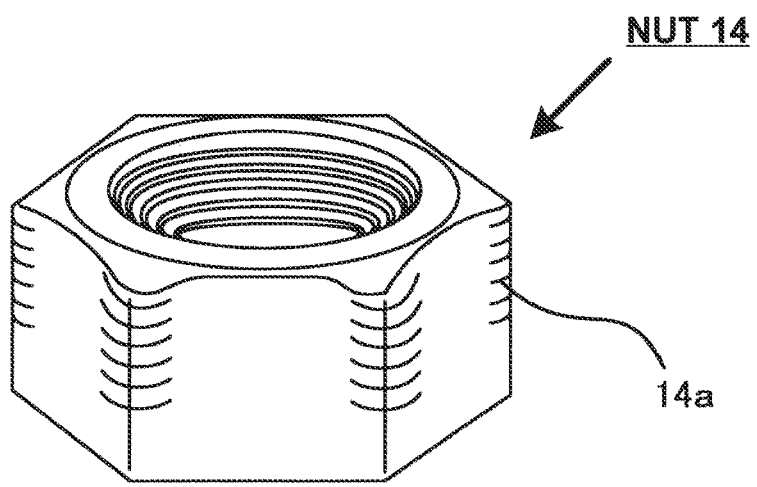
FIG. 2(b) is a perspective view of a nut (first modified example of the first embodiment).

In the illustrated example, the first male thread portion 14a is formed entirely across the side surface of the nut 14 from the upper end to the lower end. However, the present invention is not limited to the example. It is possible to form the first male thread portion on a part of the side surface from the upper end to the lower end as shown in FIG. 2(b) (applicable to other embodiments and modified examples).

Second Modified Example of First Embodiment

Figure 2C:
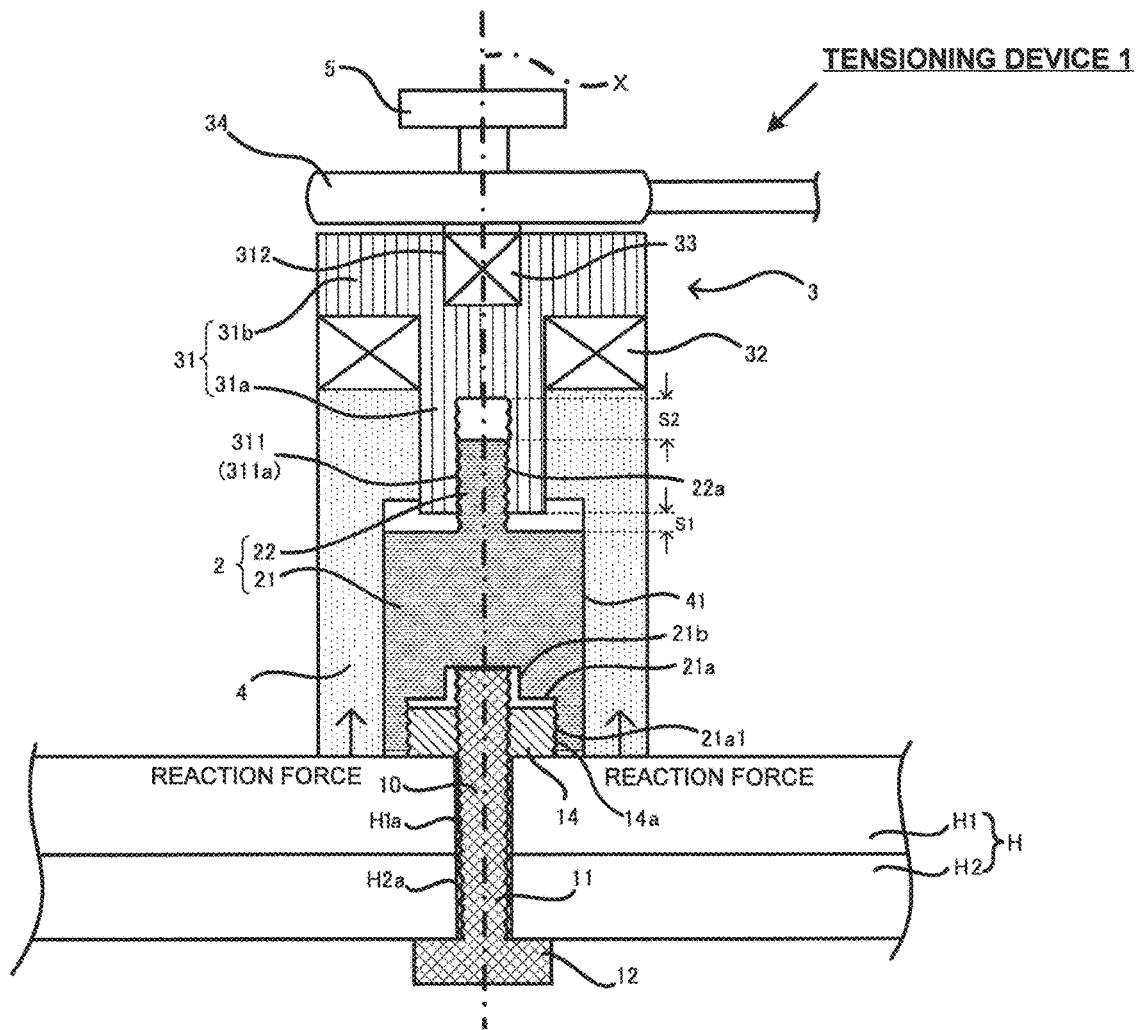
FIG. 2(c) is a schematic view of a tensioning device (second modified example of the first embodiment).

The above-described embodiment is configured to form the clearance between the lower end of the connection member 2 and the fastened body H1 when the upper surface of the nut 14 abuts on the first hollow portion 21a of connection member. However, the present invention is not limited to the example. It may be configured to satisfy the condition 1 (threaded engagement of the first female thread portion 21a1 with the first male thread portion 14a with its length equal to or longer than the single round of the outer circumferential surface of the nut 14), and the condition 2 (the clearance formed between the lower end of the connection member 2 and the fastened body H1) in abutment of the top end surface of the bolt shaft 11 on the second hollow portion 21b of connection member as shown in FIG. 2(c). The top end surface of the bolt shaft 11 may include the concave or the convex portion formed thereon. That is, it may be configured to satisfy the conditions 1 and 2 in abutment on the concave or the convex portion.

Second Embodiment

Figure 3A:
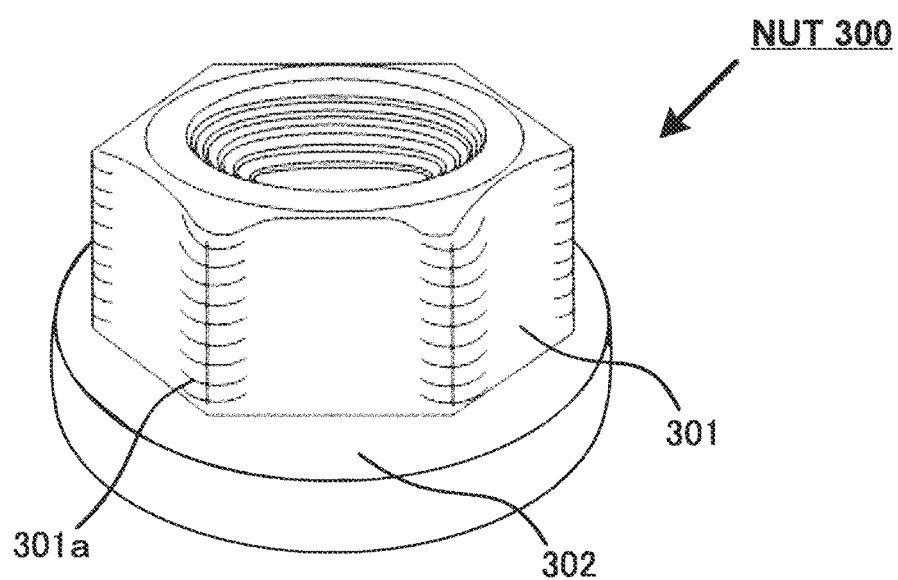
FIG. 3(a) is a perspective view of a flange nut (second embodiment).
Figure 3B:
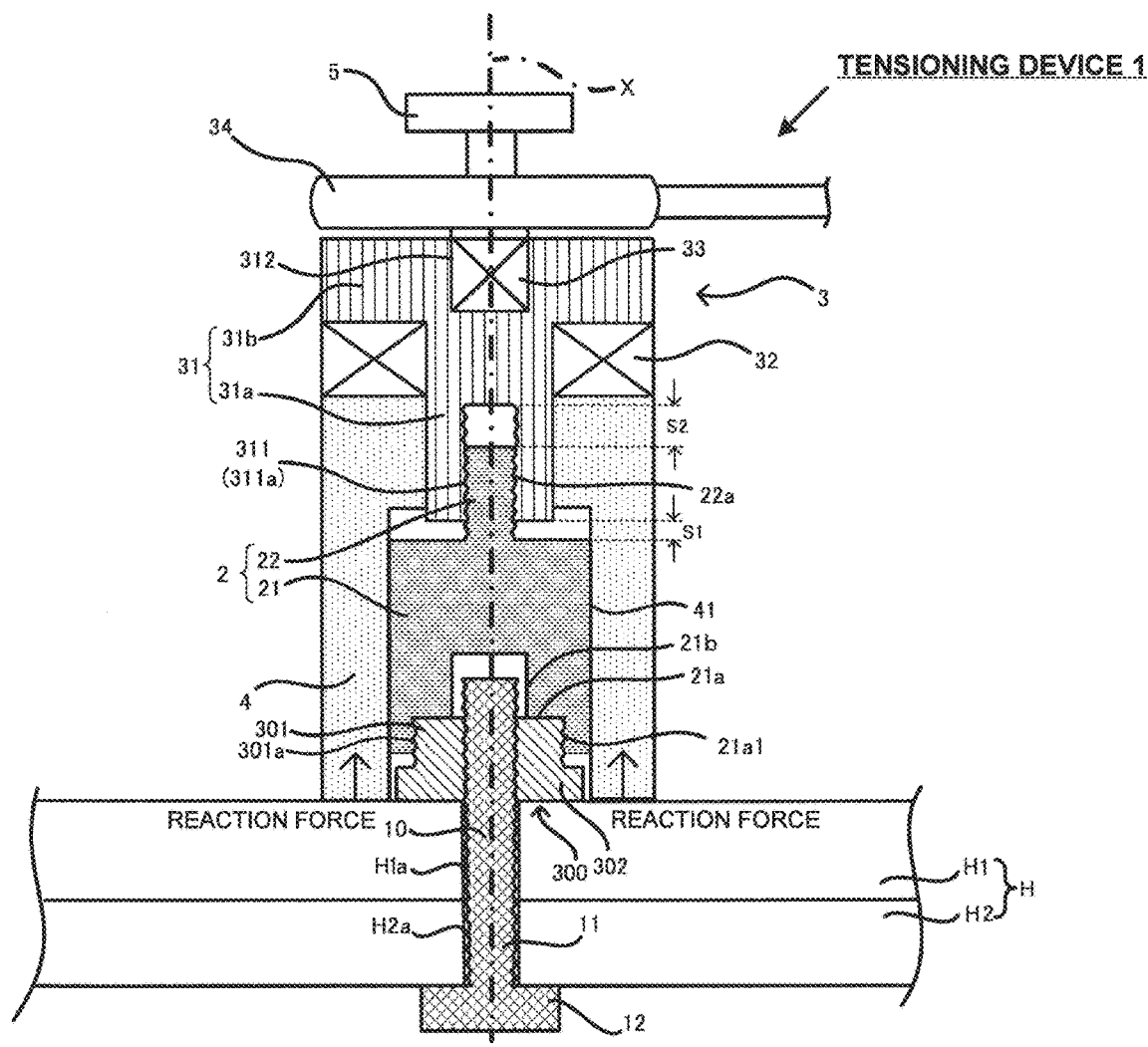
FIG. 3(b) is a schematic view of a tensioning device (second embodiment).

A second embodiment will be described referring to FIG. 3(a) and FIG. 3(b). FIG. 3(a) is a perspective view of a nut of the embodiment. FIG. 3(b) is a schematic view of a tensioning device of the embodiment. In the embodiment, a flange nut is used instead of the nut as described in the first embodiment.

A nut 300 is a flanged hexagonal nut as an example of the flange nut, and includes a hexagonal nut main body 301 and a ring shaped flange 302. The nut main body 301 and the flange 302 are integrally formed. The flange 302 radially and outwardly projecting from the nut main body 301. Circumferentially extending first male thread portions 301a are formed at intervals on an outer circumferential surface of the nut main body 301. That is, likewise the first embodiment, the first male thread portions 301a are formed on the bending shape portions of the nut main body 301, respectively.

Predetermined tensioning start conditions have to be satisfied for starting tensioning by threadly engaging the first male thread portion 301a and the first female thread portion 21a1. Followings are the predetermined tensioning start conditions (1) and (2).

(Condition 1): The first female thread portion 21a1 is threadly engaged with the first male thread portion 301a with its length equal to or longer than the single round of the outer circumferential surface of the nut main body 301.

(Condition 2): The clearance is formed between the lower end of the connection member 2 and the fastened body H1.

The technical significance of the conditions 1 and 2 is similar to the one described in the first embodiment, and detailed explanation thereof, thus will be omitted.

When the connection member 2 is rotated around the rotation axis X so as to threadly engage the first male thread portion 301a with the first female thread portion 21a1 for connection between the connection member 2 and the nut 300, the connection member 2 will threadly advance downwardly. Further rotation of the connection member 2 around the rotation axis X brings the upper surface of the nut main body 301 into abutment on the ceiling surface of the first hollow portion 21a of connection member to make the connection member 2 unrotatable. The embodiment is configured to satisfy the conditions 1 and 2 when the nut main body 301 abuts on the first hollow portion 21a of connection member (in other words, when the connection member 2 becomes no longer threadly advanceable). As the clearance formed between the lower end of the connection member 2 and the fastened body H1 does not have to be visually confirmed for every axial force detection, the accurate axial force detection may be performed through the simplified method. The upper surface of the nut main body 301 may include the concave or the convex portion formed thereon. That is, it may further be configured to satisfy the conditions 1 and 2 in abutment on the concave or the convex portion.

First Modified Example of Second Embodiment

Figure 3C:
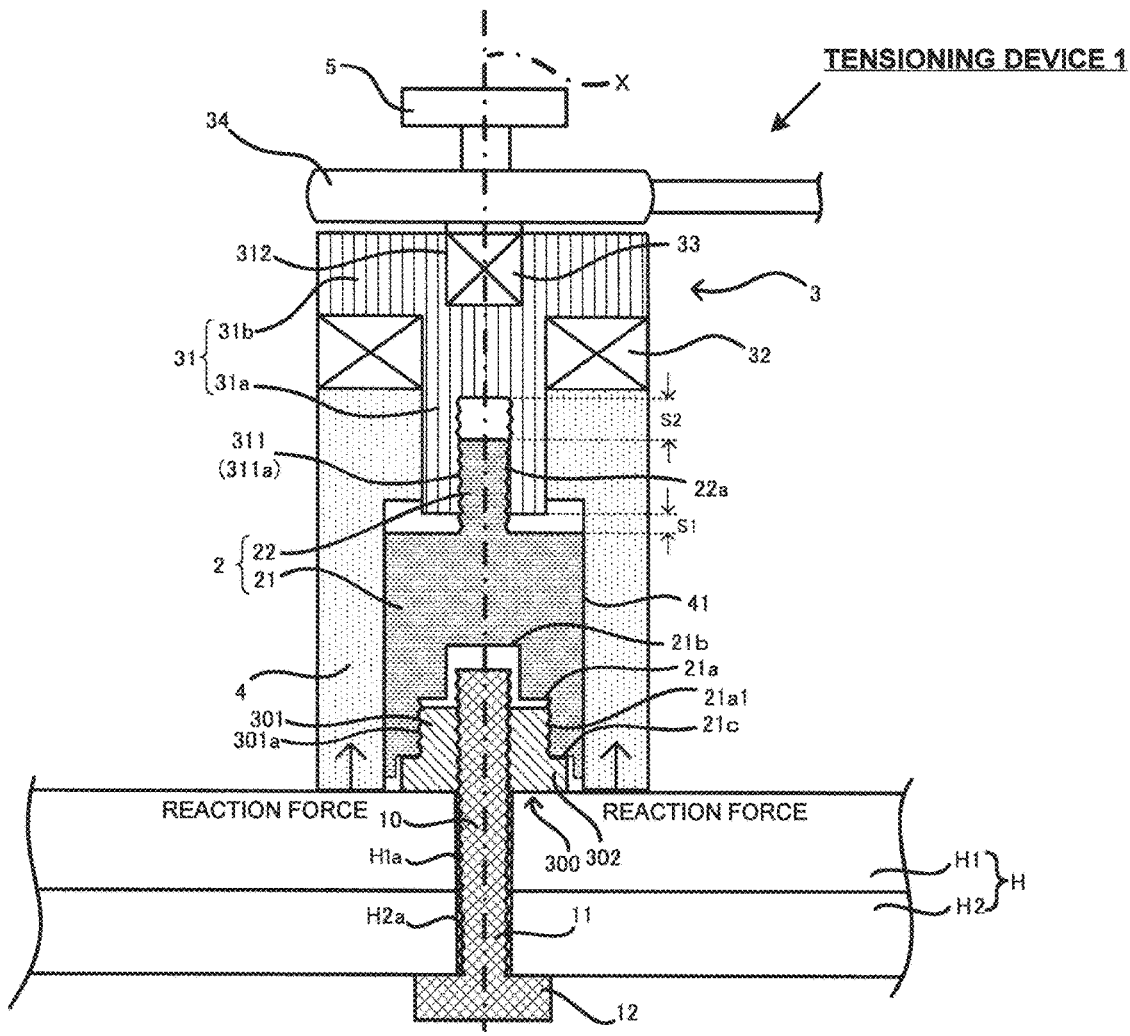
FIG. 3(c) is a schematic view of a tensioning device (first modified example of the second embodiment).

The above-described embodiment is configured to form the clearance between the lower end of the connection member 2 and the fastened body H1 when the upper surface of the nut main body 301 abuts on the first hollow portion 21a of connection member. However, the present invention is not limited to the example. FIG. 3(c) is a schematic view of a tensioning device of the modified example which is different from the tensioning device of the second embodiment in that a third hollow portion 21c of connection member is formed. The third hollow portion 21c of connection member is connected to the lower end of the first hollow portion 21a of connection member, and has the diameter dimension set to be larger than that of the first hollow portion 21a of connection member.

The modified example is configured to satisfy the condition 1 (threaded engagement of the first female thread portion 21a1 with the first male thread portion 301a with its length equal to or longer than the single round of the outer circumferential surface of the nut main body 301), and the condition 2 (the clearance formed between the lower end of the connection member 2 and the fastened body H1) in abutment of the upper surface of the flange 302 of the nut 300 on the ceiling surface of the third hollow portion 21c of connection member. The upper surface of the flange 302 may include the concave or the convex portion formed thereon. That is, it may be configured to satisfy the conditions 1 and 2 in abutment on the concave or the convex portion. Likewise the first modified example of the first embodiment, it may be configured to satisfy the conditions 1 and 2 in abutment of the top end surface of the bolt shaft 11 (including the concave or the convex portion formed on the top end surface of the bolt shaft 11, if any) on the ceiling surface of the second hollow portion 21b of connection member.

Second Modified Example of Second Embodiment

Figure 3D:
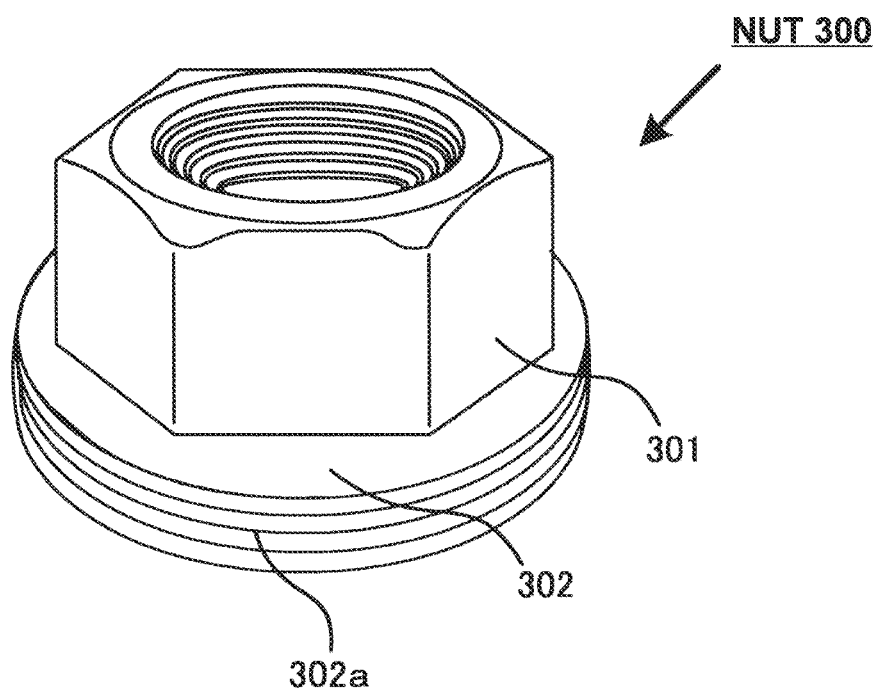
FIG. 3(d) is a perspective view of a nut (second modified example of the second embodiment).
Figure 3:
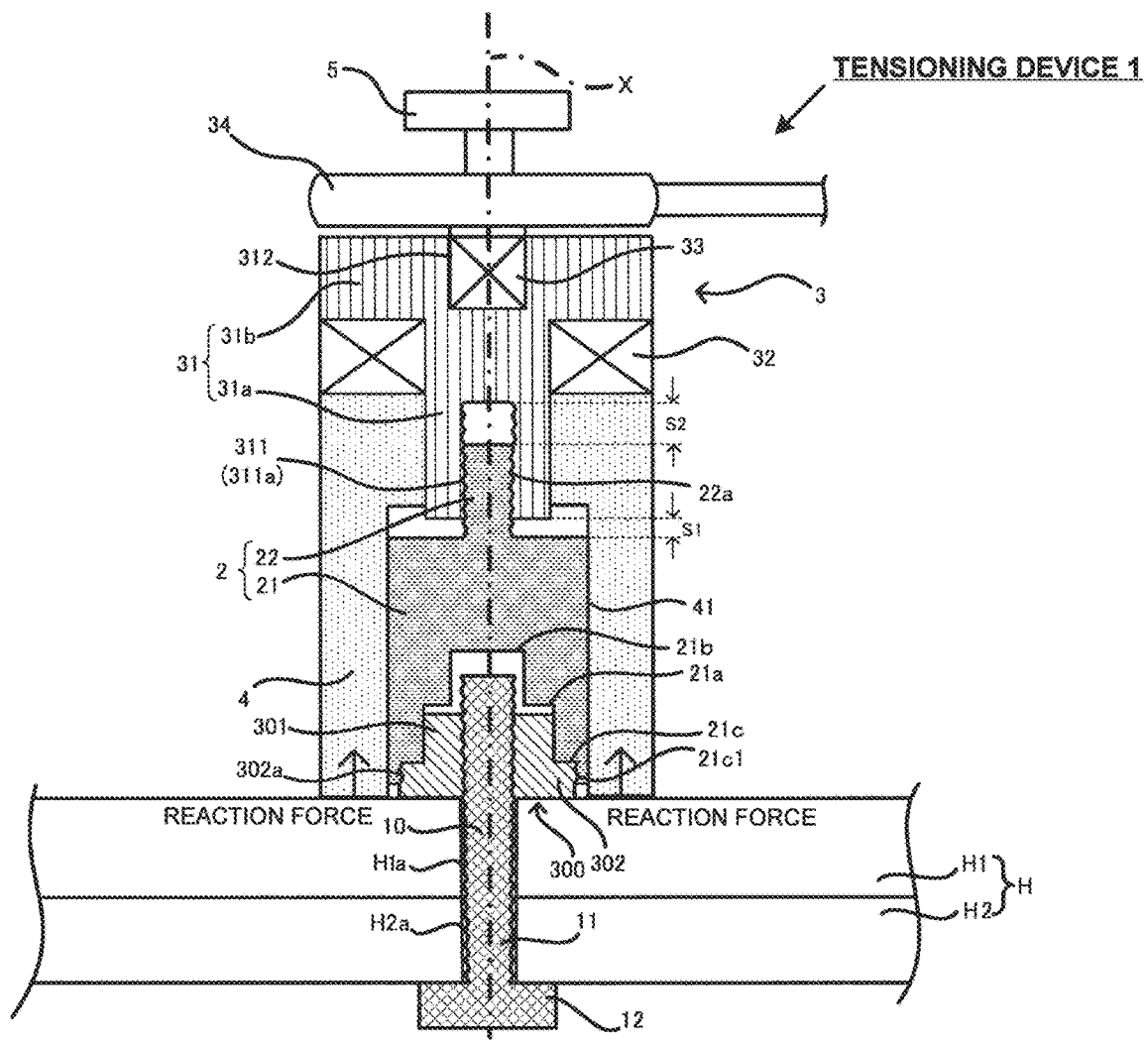
FIG. 3(e) is a schematic view of a tensioning device (second modified example of the second embodiment).
FIG. 3(f) is a schematic view of a tensioning device (third modified example of the second embodiment).
FIG. 3(g) is a perspective view of a nut (fourth modified example of the second embodiment).

FIG. 3(d) is a perspective view of a nut of the modified example. FIG. 3(e) is a schematic view of a tensioning device of the modified example. The nut 300 of the modified example is different from the nut of the second embodiment in that a first male thread portion 301a is not formed on the outer circumferential surface of the nut main body 301, and that the circumferentially extending first male thread portion 302a is continuously formed on the outer circumferential surface of the flange 302. The tensioning device of the modified example is different from the tensioning device of the first modified example of the second embodiment in that the first female thread portion 21a1 is not formed on the circumferential surface of the first hollow portion 21a of connection member, and the first female thread portion 21c1 is formed on the circumferential surface of the third hollow portion 21c of connection member.

When the connection member 2 is rotated around the rotation axis X so as to threadly engage the first male thread portion 302a with the first female thread portion 21c1 for connection between the connection member 2 and the nut 300, the connection member 2 will threadly advance downwardly. Further rotation of the connection member 2 around the rotation axis X brings the upper surface of the flange 302 into abutment on the ceiling surface of the third hollow portion 21c of connection member to make the connection member 2 unrotatable. The embodiment is configured to satisfy the conditions 1 and 2 when the flange 302 abuts on the third hollow portion 21c of connection member (in other words, when the connection member 2 becomes no longer threadly advanceable). As the clearance formed between the lower end of the connection member 2 and the fastened body H1 does not have to be visually confirmed for every axial force detection, the accurate axial force detection may be performed through the simplified method. The upper surface of the flange 302 may include the concave or the convex portion formed thereon. That is, it may further be configured to satisfy the conditions 1 and 2 in abutment on the concave or the convex portion. Furthermore, it may be configured to satisfy the conditions 1 and 2 in abutment of the upper surface of the nut main body 301 (including the concave or the convex portion formed on the upper surface of the nut main body 301, if any) on the first hollow portion 21a of connection member, or in abutment of the top end surface of the bolt shaft 11 (including the concave or the convex portion formed on the top end surface of the bolt shaft 11, if any) on the second hollow portion 21b of connection member.

Third Modified Example of Second Embodiment

Figure 3F:
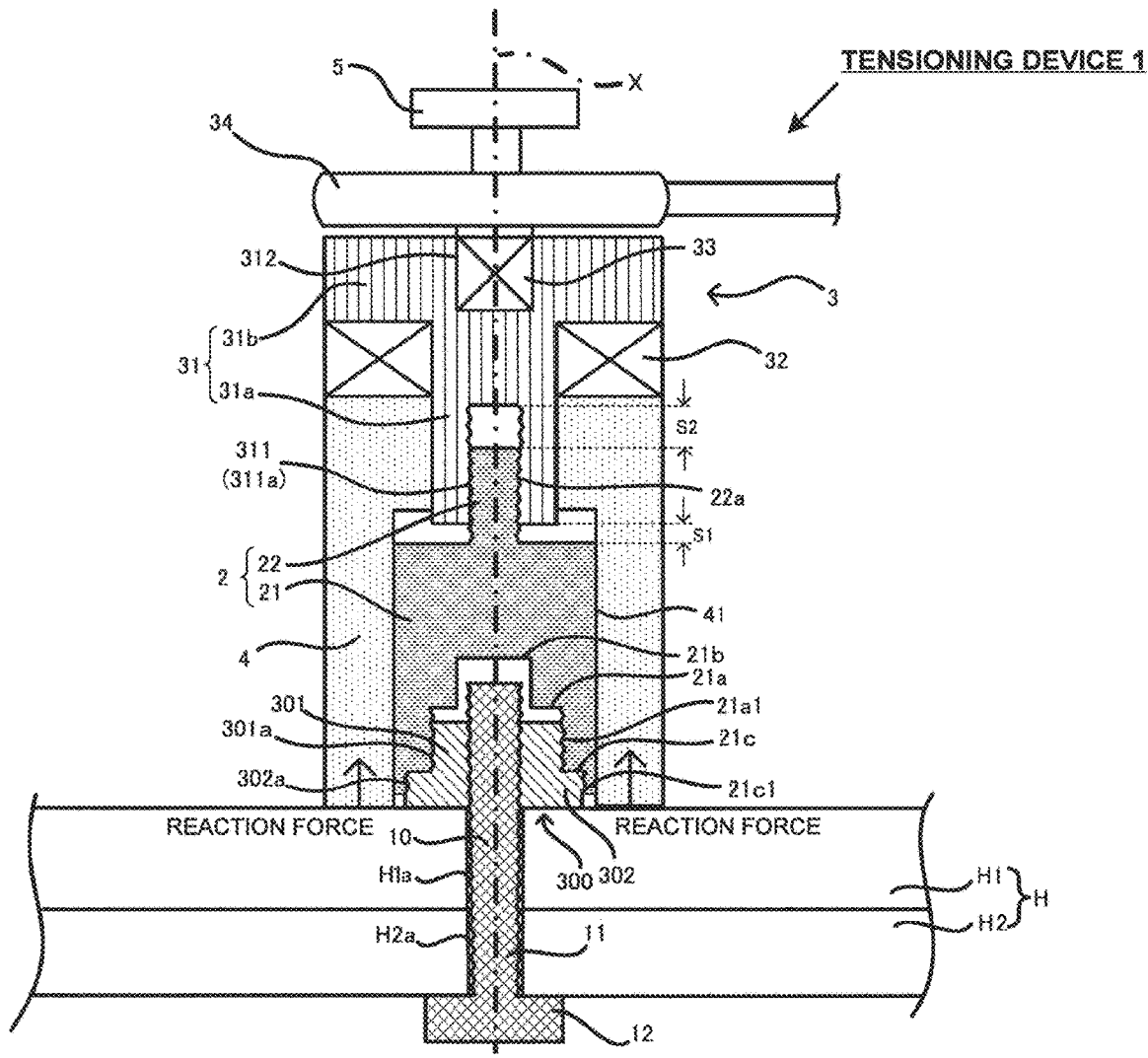

FIG. 3(f) is a schematic view of a tensioning device of a modified example. The nut 300 of the modified example includes the first male thread portion 301a formed on the outer circumferential surface of the nut main body 301, and the first male thread portion 302a formed on the outer circumferential surface of the flange 302. Each of the first male thread portions 301a and 302a is required to have the same pitch. Otherwise, the first male thread portions 301a and 302a cannot be threadly engaged with the connection member 2. As details of the first male thread portions 301a and 302a have been described as above, the repetitive explanations will be omitted.

When the connection member 2 is rotated around the rotation axis X so as to threadly engage the first male thread portion 301a with the first female thread portion 21a1, and to threadly engage the first male thread portion 302a with the first female thread portion 21c1 for connection between the connection member 2 and the nut 300, the connection member 2 will threadly advance downwardly. Further rotation of the connection member 2 around the rotation axis X brings the upper surface of the flange 302 of the nut 300 (including the concave or the convex portion formed on the upper surface of the flange 302, if any) into abutment on the ceiling surface of the third hollow portion 21c of connection member to make the connection member 2 unrotatable. The embodiment is configured to satisfy the condition 1 (threaded engagement of the first female thread portion 21a1 with the first male thread portion 301a with its length equal to or longer than the single round of the outer circumferential surface of the nut main body 301, and threaded engagement of the first female thread portion 21c1 with the first male thread portion 302a with its length equal to or longer than the single round of the outer circumferential surface of the flange 302), and the condition 2 (the clearance formed between the lower end of the connection member 2 and the fastened body H1) in abutment of the flange 302 on the third hollow portion 21c of connection member (in other words, when the connection member 2 becomes no longer threadly advanceable). As the clearance formed between the lower end of the connection member 2 and the fastened body H1 does not have to be visually confirmed for every axial force detection, the accurate axial force detection may be performed through the simplified method. It may be configured to satisfy the conditions 1 and 2 in abutment of the upper surface of the nut main body 301 (including the concave or the convex portion on the upper surface of the nut main body 301, if any) on the first hollow portion 21a of connection member, or in abutment of the top end surface of the bolt shaft 11 (including the concave or the convex portion on the top end surface of the bolt shaft 11, if any) on the second hollow portion 21b of connection member.

Fourth Modified Example of Second Embodiment

Figure 3G:
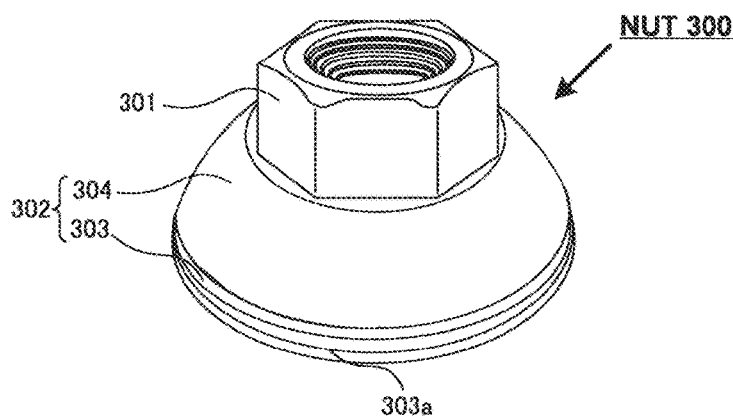

In the second embodiment and the modified example of the second embodiment, the flange 302 has a flat shape. However, the present invention is not limited to the examples. FIG. 3(g) is a perspective view of a nut of a modified example. Referring to the drawing, the flange 302 includes a lower end flat portion 303, and a curved surface 304 upwardly extending from an outer edge on an upper surface of the lower end flat portion 303 while forming a dome-like shape. The curved surface 304 may be formed into a frustum shape. A circumferentially extending first male thread portion 303a is formed on the outer circumferential surface of the lower end flat portion 303. The first male thread portion may be formed on the nut main body 301. It is also possible to form the first male thread portions on both the nut main body 301 and the lower end flat portion 303.

It may be configured to satisfy the conditions 1 and 2 when the top end surface of the bolt shaft 11 (including the concave or the convex portion formed on the top end surface of the bolt shaft 11, if any) abuts on the ceiling surface of the second hollow portion 21b of connection member, the upper surface of the nut main body 301 (including the concave or the convex portion formed on the upper surface of the nut main body 301, if any) abuts on the ceiling surface of the first hollow portion 21a of connection member, or the curved surface 304 (in the case of the frustum shape, the tapered surface) abuts on the ceiling surface of the third hollow portion 21c of connection member. The concave or the convex portion formed on the curved surface 304 (or the tapered surface), if any, may be considered as the part to be brought into abutment.

Third Embodiment

Figure 4A:
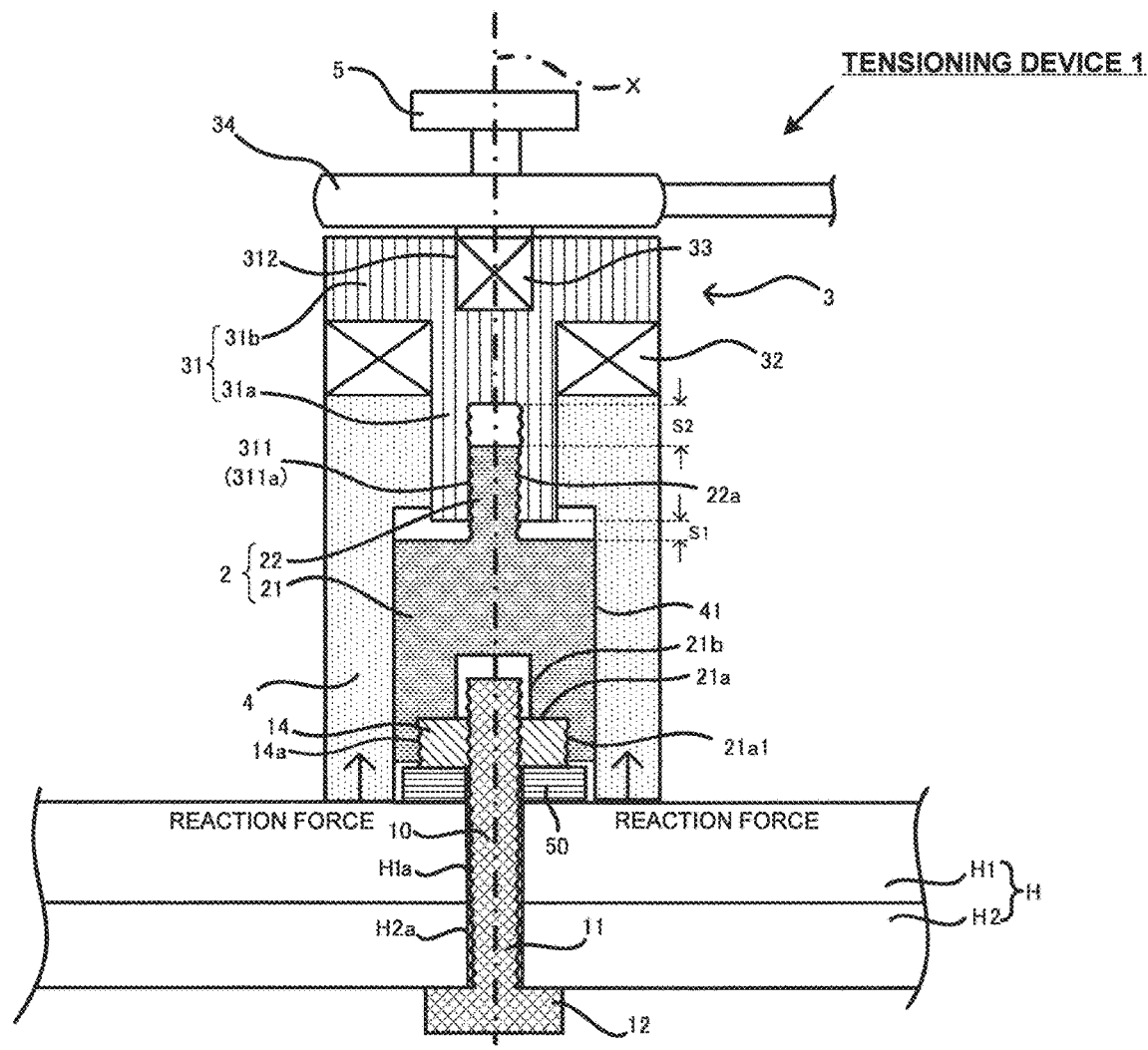
FIG. 4(a) is a schematic view of a tensioning device (third embodiment).

A third embodiment will be described referring to FIG. 4(a). FIG. 4(a) corresponding to FIG. 1 represents the state just after abutment of the tension bearer 4 on the fastened body H1. In this embodiment, a flat washer 50 intervenes between the nut 14 and the fastened body H1. The washer 50 has its diameter dimension set to be smaller than the inner diameter of the tension hollow portion 41. A very small clearance is formed between the lower end of the connection member 2 and the washer 50. Upon the axial force detection in the pressure contact state between the lower end of the connection member 2 and the washer 50, the detection error is aggravated. Accordingly, the detection error may be reduced by performing the axial force detection while leaving the very small clearance between the lower end of the connection member 2 and the washer 50.

Figure 4B:
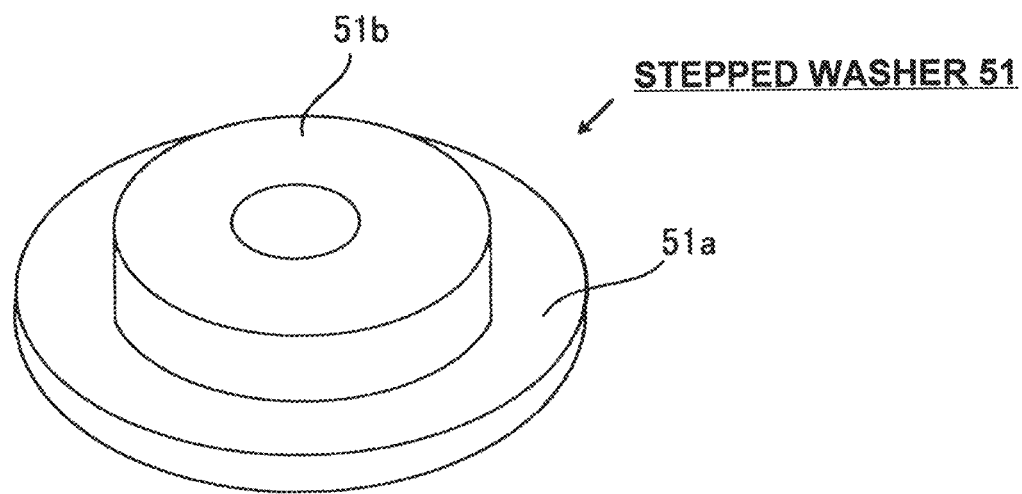
FIG. 4(b) is a perspective view of a stepped washer.
Figure 4C:
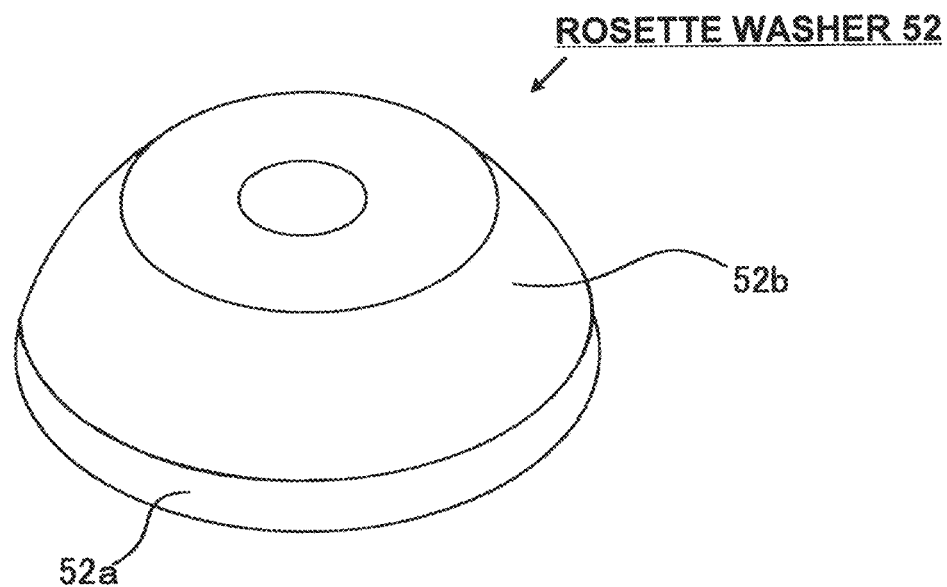
FIG. 4(c) is a perspective view of a rosette washer.

The washer 50 is insertedly fitted with the bolt shaft 11 to which the nut 14 is fastened from above the washer 50. That is, the washer 50 is clamped between the fastened body H1 and the nut 14. The washer 50 has the outer diameter dimension set to be larger than that of the nut 14. The washer 50 may be a stepped washer 51 as shown in FIG. 4(b) other than the flat type. The stepped washer 51 includes a large-diameter washer portion 51a and a small-diameter washer portion 51b formed on the upper surface of the large-diameter washer portion 51a. The large-diameter washer portion 51a is integrally formed with the small-diameter washer portion 51b, and has its outer diameter dimension set to be larger than that of the small-diameter washer portion 51b. As FIG. 4(c) shows, the washer may be a rosette washer 52 including a lower end flat portion 52a, and a curved surface 52b upwardly extending from the lower end flat portion 52a while forming the dome-like shape. The curved surface 52b may be formed into a frustum shape.

This embodiment is similar to the first embodiment in that the first male thread portion 14a is formed on the outer circumferential surface of the nut 14. Each vertical dimension of the first hollow portion 21a of connection member and the second hollow portion 21b of connection member is set so that the upper surface of the nut 14 abuts on the ceiling surface of the first hollow portion 21a of connection member before abutment of the bolt shaft 11 on the ceiling surface of the second hollow portion 21b of connection member upon threaded engagement of the connection member 2 with the washer 50.

That is, this embodiment is similar to the first embodiment in that the conditions 1 and 2 are satisfied when the upper surface of the nut 14 (including the concave or the convex portion formed on the upper surface of the nut 14, if any) abuts on the ceiling surface of the first hollow portion 21a of connection member. It may be configured to satisfy the conditions 1 and 2 when the top end surface of the bolt shaft 11 (including the concave or the convex portion formed on the top end surface of the bolt shaft 11, if any) abuts on the ceiling surface of the second hollow portion 21b of connection member. It may be configured to satisfy the conditions 1 and 2 when the upper surface of the washer 50 (including the concave or the convex portion formed on the upper surface of the washer 50, if any) abuts on the connection member 2. It may also be configured to satisfy the conditions 1 and 2 when the upper surface of the stepped washer 51 (including the concave or the convex portion formed on the upper surface of the stepped washer 51, if any) abuts on the connection member 2. The upper surface of the stepped washer 51 may be the upper surface of the large-diameter washer portion 51a or the upper surface of the small-diameter washer portion 51b. The curved surface (or tapered surface in the case of the frustum shape) 52b (including the concave or the convex portion formed on the curved surface or the tapered surface, if any) of the rosette washer 52 may be considered as the part to be brought into abutment. The effects similar to those of the first embodiment may be derived from the structure of this embodiment.

Fourth Embodiment

Figure 5:
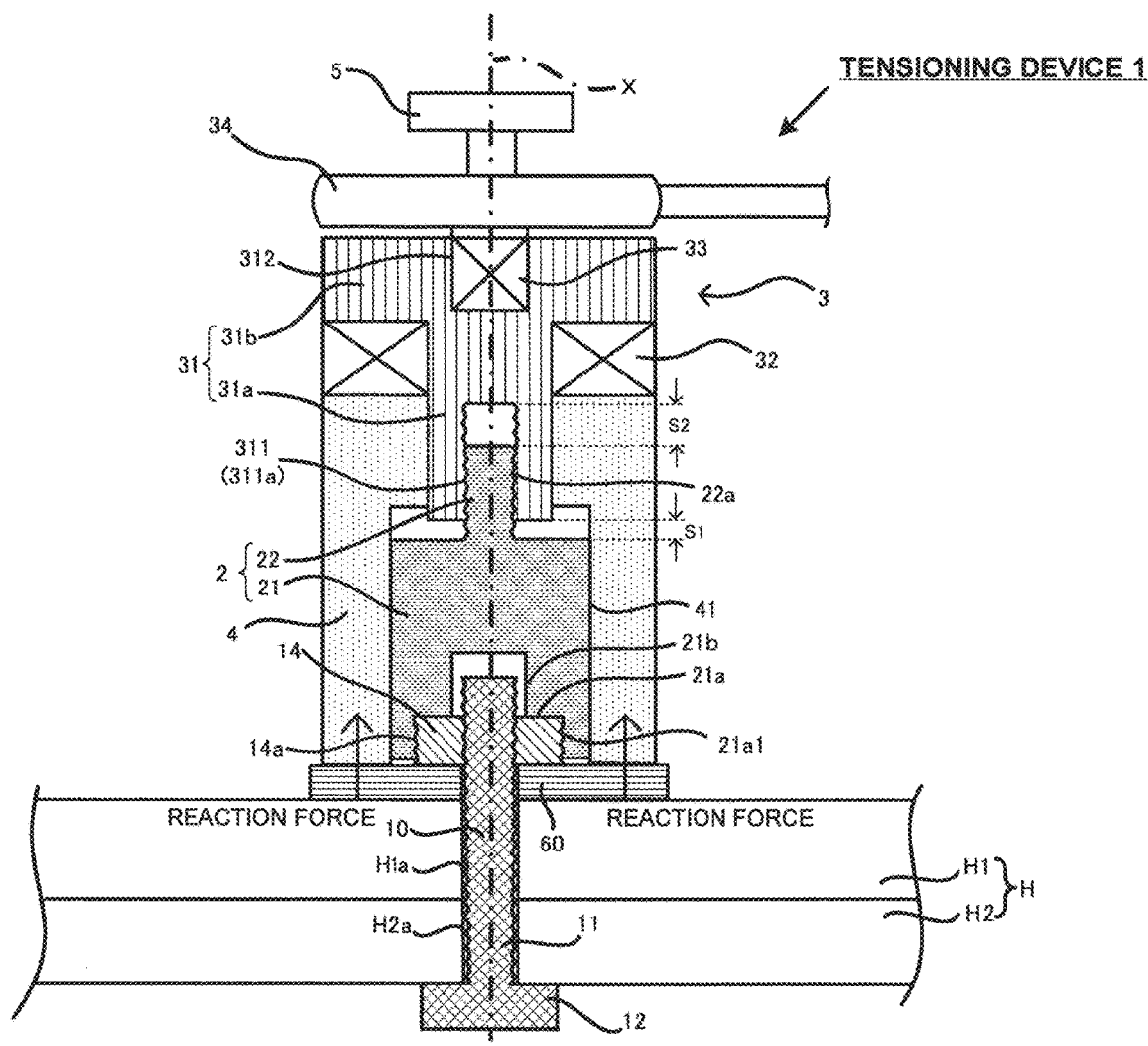
FIG. 5 is a schematic view of a tensioning device (fourth embodiment).

A fourth embodiment will be described referring to FIG. 5. FIG. 5 represents the state just after abutment of the tension bearer 4 on a protection plate 60. That is, the protection plate 60 may be intervened between the nut 14 and the tension bearer 4, and the fastened body H1. The protection plate 60 has an opening through which the bolt shaft 11 is inserted, and a diameter dimension set to be larger than the outer diameter of the tension bearer 4. When rotating the handle 5 to move down the tension bearer 4, the protection plate 60 instead of the fastened body H1 will abut on the tension bearer 4. In this case, the reaction force applied from the fastened body H1 in the axial force detection is transmitted to the tension bearer 4 via the protection plate 60.

This embodiment is especially preferable to the case where rigidity (EI) and resilient limit strength of the fastened member H are lower than those of the tension bearer 4. The "E" denotes Young's modulus, and "I" denotes the cross-sectional secondary moment. Specifically, upon detection of the axial force by abutting the tension bearer 4 on the fastened body H1, the load is concentratedly exerted to the abutment part of the fastened body H1. In the above-described case, the low rigidity of the fastened body H1 may cause the risk of deformation thereof. The embodiment employs the protection plate 60 with the diameter dimension larger than the outer diameter of the tension bearer 4, which is interposed between the tension bearer 4 and the fastened body H1 so that the abutment area is increased to distribute the load, resulting in reduced load exerted to the fastened member H.

The protection plate 60 may be made of the material (heat treated steel material, for example) with higher rigidity (EI) and higher resilient limit strength than those of the fastened member H. Detection of the reaction force via the protection plate 60 with higher rigidity (EI) may reduce detection error of the axial force detection.

A very small clearance is formed between the lower end of the connection member 2 and the protection plate 60. As the effect derived from formation of the very small clearance is similar to the effect of the third embodiment, detailed explanation will be omitted.

First Modified Example of Fourth Embodiment

Figure 6:
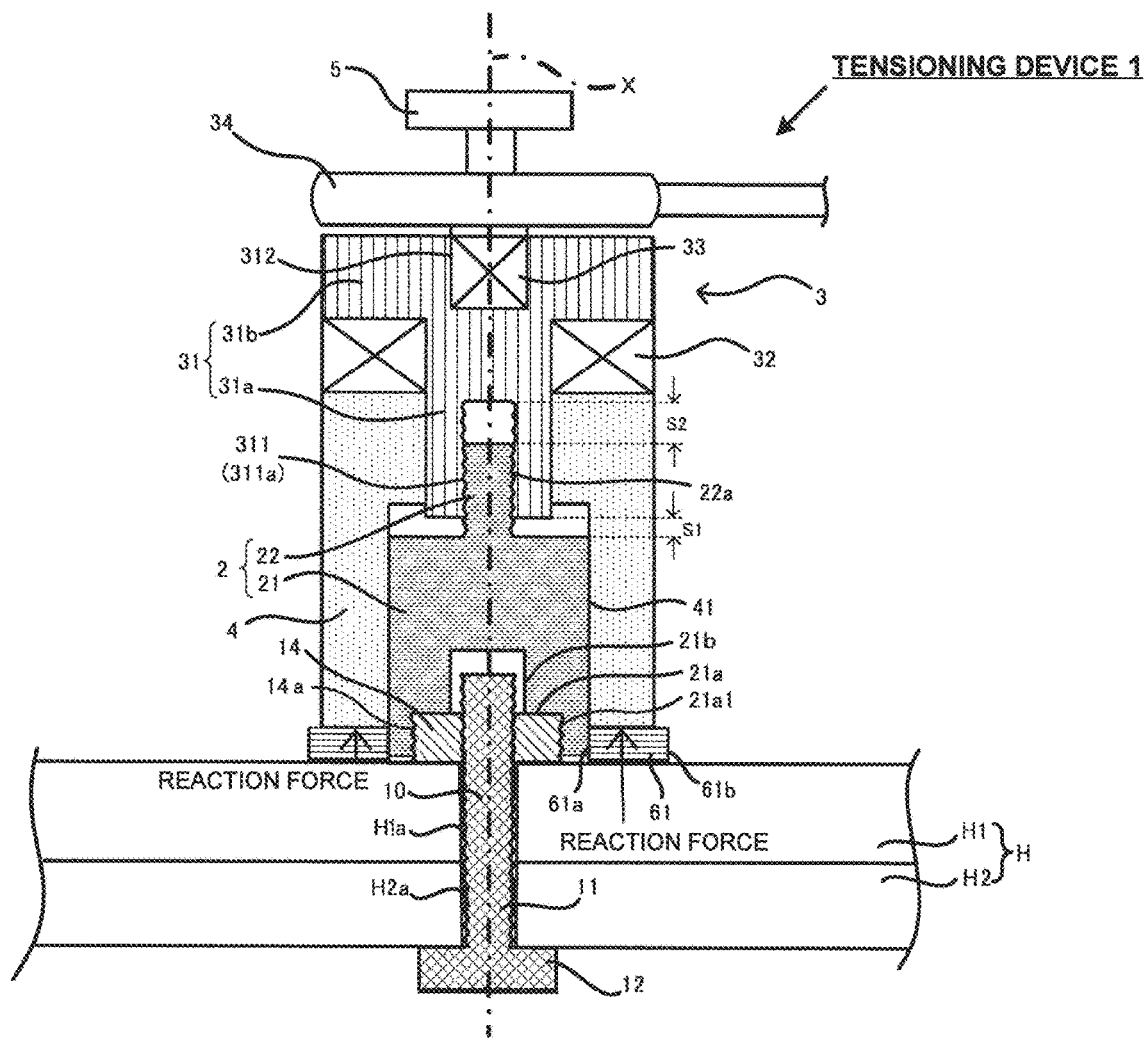
FIG. 6 is a schematic view of a tensioning device (modified example of the fourth embodiment).

FIG. 6 shows a modified example of the protection plate. A protection plate 61 formed to have a ring-like shape (an arbitrary shape other than the ring-like shape is available) is intervened between the tension bearer 4 and the fastened body H1 so as not to be located just below the nut 14. The protection plate 61 has an inner edge portion 61a at a position corresponding to the inner edge portion of the tension bearer 4, and an outer edge portion 61b at a position radially protruding from the outer edge portion of the tension bearer 4. The similar advantageous effects to those of the fourth embodiment may be derived from the example. In this example, adjustment of the thickness of the protection plate 61 in the radial direction may substantially equalize a deformation amount of the fastened body H1 just below the nut 14 to that of the fastened body H1 just below the protection plate 61. Specifically, assuming that the deformation amount of the fastened body H1 just below the nut 14 before starting tensioning by the tensioning mechanism 3 is S1, and the deformation amount of the fastened body H1 just below the protection plate 61 after starting tensioning by the tensioning mechanism 3 is S2, it is preferable to preliminarily adjust the area of the protection plate 61 in contact with the fastened body H1 so that the deformation amounts S1 and S2 are substantially equalized. Each of the deformation amounts S1 and S2 refers to the deformation amount of the bolt 10 in the axial direction. The protection plate 61 may be provided as a part of the tension bearer 4. In this case, it is preferable to adjust the contact area of the abutment part (in other words, the lower end) of the tension bearer 4 in contact with the fastened body H1 to satisfy the above-described condition. The appropriate contact area may be obtained through preliminary experiment or simulation.

An explanation will be made with respect to advantageous effects derived from substantially equalizing the deformation amounts. Tensioning the nut 14 will release the deformation amount when tightening the fastened body H1 just below the nut 14 (in other words, the fastened body just below the nut 14 becomes nearly in the no-load state). In order to retain the deformed state resulting from tensioning the nut 14, the fastened body H1 is kept deformed with the protection plate 61 likewise the tightened state so as to improve the axial force detection accuracy. It is to be clearly understood that structures of the fourth embodiment and the modified example thereof are applicable to any other embodiments and modified examples thereof.

Fifth Embodiment

In the above-described embodiment and the modified example thereof, the nut is the hexagonal nut. However, the present invention is not limited to the example. For instance, it is possible to replace the hexagonal nut with the square nut or the dodecagonal nut. The square nut and the dodecagonal nut may be either flanged or flangeless. As the dodecagonal nut includes more threadly engageable ridges than those of the hexagonal nut and the square nut, the tensioning may be stably performed. It is therefore possible to improve the tensile strength while improving the axial force detection accuracy.

Assuming that a width across flat of the dodecagonal nut, an outer diameter of the male thread of the first male thread portion, and a bottom diameter of the male thread of the first male thread portion are defined as S, D1 and D2, respectively, it is preferable to satisfy the following relational expressions (3) and/or (4).

$$D1 > S \times 1.04 \qquad (3)$$

$$D2 < S \times 1.13 \qquad (4)$$

By satisfying the relational expression (3), the engagement of the fastening tool with the dodecagonal nut to be fastened may be improved. By satisfying the relational expression (4), the engagement of the first male thread portion with the first female thread portion 21a1 of the connection member 2 may be improved upon tensioning of the dodecagonal nut with the connection member 2. As the dodecagonal nut includes more threadly engageable ridges than those of the hexagonal nut and the square nut, the tensioning may be stably performed. It is therefore possible to improve the tensile strength while improving the axial force detection accuracy.

Assuming that a width across flat of the square nut, an outer diameter of the male thread of the first male thread portion, and the bottom diameter of the male thread of the first male thread portion are defined as S, D1 and D2, respectively, it is preferable to satisfy the following relational expressions (5) and/or (6).

$$D1 > S \times 1.03 \qquad (5)$$

$$D2 < S \times 1.32 \qquad (6)$$

By satisfying the relational expression (5), the engagement of the fastening tool with the square nut to be fastened may be improved. By satisfying the relational expression (6), the engagement of the first male thread portion with the first female thread portion 21a1 of the connection member 2 may be improved upon tensioning of the square nut with the connection member 2.

REFERENCE SIGNS LIST 1 tensioning device
2 connection member
3 tensioning mechanism
4 tension bearer
5 handle
10 bolt
14 300 nut
14a, 301a, 302a first male thread portion
21 column portion
21a first hollow portion of connection member
21a1 first female thread portion
21b second hollow portion of connection member
22 convex portion
22a second male thread portion
31 tension rod
31a small-diameter rod portion
31b large-diameter rod portion
32 bearing
33 angle drive
34 wrench
50 washer
311 tension rod hollow portion
311a second female thread portion
H (H1, H2) fastened member

The invention claimed is:
1. A tensioning device which applies upward tension to a bolt-nut fastener including a bolt insertedly fitted with a fastened member, and a nut to be fastened to a shaft of the bolt, the shaft protruding from the fastened member, and the nut having a first male thread portion formed on an outer circumferential surface, the tensioning device comprising:
a connection member having a first female thread portion to be threadly engaged with the first male thread portion;

a tensioning mechanism which tensions the nut via the connection member while having the first male thread portion threadly engaged with the first female thread portion; and a tension bearer which is disposed around an outer circumference of the connection member, and bears a reaction force applied from the fastened member in tensioning performed by the tensioning mechanism.

2. The tensioning device according to claim 1, wherein:

the tensioning mechanism includes a tension rod, a bearing which rotatably supports the tension rod around a vertically extending shaft portion, and a rotation mechanism serving to rotate the tension rod around the shaft portion;

a convex portion having a second male thread portion formed on an outer circumferential surface is disposed on an upper end of the contact member; and a hollow portion having a second female thread portion to be threadly engaged with the second male thread portion on an inner circumferential surface is formed in a lower end of the tension rod.

3. The tensioning device according to claim 2, wherein the tension bearer is vertically interposed between the bearing and the fastened member.

4. The tensioning device according to claim 2, wherein the convex portion has an axial diameter which is substantially the same as that of the bolt, and a friction torque reducing agent for reducing a friction torque is applied to the second male thread portion and the second female thread portion.

5. The tensioning device according to claim 1, wherein a tensile strength of the connection member is higher than that of the bolt.

6. The tensioning device according to claim 1, wherein the nut is a hexagonal nut, having the first male thread portion formed on a bending shape portion of the outer circumferential surface of the nut.

7. The tensioning device according to claim 6, wherein the following relational expressions (1) and/or (2) are satisfied:

$$D1 > S \times 1.03 \quad (1)$$

$$D2 < S \times 1.10 \quad (2)$$

where S denotes a width across flat of the nut, D1 denotes an outer diameter of a male thread of the first male thread portion, and D2 denotes a bottom diameter of a male thread of the first male thread portion.

8. The tensioning device according to claim 1, wherein:

the nut is a flange nut having a nut main body and a flange; and the first male thread portion is formed on at least one of the nut main body and the flange.

9. The tensioning device according to claim 1, wherein the connection member includes a concave portion which prevents a contact with the shaft protruding from the nut.

10. The tensioning device according to claim 1, comprising a protection plate which intervenes between the tension bearer and the fastened member in tensioning performed by the tensioning mechanism.

11. The tensioning device according to claim 10, wherein a contact area of the protection plate with the fastened member is adjusted so that a deformation amount S1 of the fastened member just below the nut before starting tensioning by the tensioning mechanism is substantially equalized to a deformation amount S2 of the fastened member just below the protection plate after starting tensioning by the tensioning mechanism.

12. The tensioning device according to claim 1, wherein a contact area of the tension bearer with the fastened member is adjusted so that a deformation amount S1 of the fastened member just below the nut before starting tensioning by the tensioning mechanism is substantially equalized to a deformation amount S2 of the fastened member just below the tension bearer after starting tensioning by the tensioning mechanism.

* * * * *